US010228963B2

(12) United States Patent
Court et al.

(10) Patent No.: US 10,228,963 B2
(45) Date of Patent: Mar. 12, 2019

(54) EFFICIENT HYPERVISOR REPORTING

(71) Applicant: Red Hat, Inc., Raleigh, NC (US)

(72) Inventors: Barnaby L. Court, Raleigh, NC (US); Christopher N. Snyder, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 95 days.

(21) Appl. No.: 15/383,268

(22) Filed: Dec. 19, 2016

(65) Prior Publication Data

US 2018/0173550 A1    Jun. 21, 2018

(51) Int. Cl.
  *G06F 11/34*   (2006.01)
  *G06F 9/455*   (2018.01)

(52) U.S. Cl.
  CPC ........ *G06F 9/45558* (2013.01); *G06F 11/34* (2013.01); *G06F 2009/45591* (2013.01)

(58) Field of Classification Search
  None
  See application file for complete search history.

(56) References Cited

U.S. PATENT DOCUMENTS

| 8,694,738 | B2 | 4/2014 | Bhattacharjee et al. |
| 8,832,684 | B2 | 9/2014 | Thober et al. |
| 9,015,709 | B2 | 4/2015 | Voccio |
| 9,135,038 | B1 | 9/2015 | Uchronski et al. |
| 2015/0331763 | A1 | 11/2015 | Cao et al. |
| 2016/0179696 | A1 | 6/2016 | Zmudzinski |
| 2016/0306706 | A1 | 10/2016 | Pawar et al. |

OTHER PUBLICATIONS

Red Hat Satellite 6.1 Installation Guide 2015.*
Author Unknown, "Chapter 6. Managing Hypervisors and Virtual Guest Subscriptions," Redhat Customer Portal, available at least as early as Nov. 2, 2016, 3 pages, https://access.redhat.com/documentation/en-US/Red_Hat_Satellite/6.1/html/Installation_Guide/chap-Red_Hat_Satellite-Installation_Guide-Managing_Hypervisors_and_Virtual_Guest_Subscriptions.html.
Chen, Zhuan et al., "Virtualization and Virtual Data Management for Field Data Sensing," University of Rochester Computer Science Department, Technical Report 997, Jun. 2016, 31 pages.
Felter, Wes et al., "An Updated Performance Comparison of Virtual Machines and Linux Containers," IBM Research, Technical Paper, Jul. 21, 2014, 12 pages.

* cited by examiner

*Primary Examiner* — Sisley N Kim
(74) *Attorney, Agent, or Firm* — Withrow & Terranova, PLLC

(57) ABSTRACT

Mechanisms for efficient hypervisor reporting are disclosed. A first communication from a first hypervisor reporter is received that identifies a first hypervisor as a hypervisor about which the first hypervisor reporter can generate reports over time. It is determined that no other hypervisor reporter is a current authority for the first hypervisor. The first hypervisor reporter is designated as a current authority for the first hypervisor. A first full report is requested from the first hypervisor reporter about the first hypervisor.

21 Claims, 11 Drawing Sheets

US 10,228,963 B2

EFFICIENT HYPERVISOR REPORTING

TECHNICAL FIELD

The examples relate generally to virtualization, and in particular to efficient hypervisor reporting.

BACKGROUND

Computing environments increasingly utilize virtualization technology that facilitates a large number of processing instances, such as virtual machines, that are controlled by a single hypervisor that is associated with a single hardware (i.e., "bare metal") machine. In many situations it is desirable or necessary to maintain accurate information regarding which virtual machines are associated with which hypervisors.

SUMMARY

The examples disclosed herein implement efficient hypervisor reporting that substantially reduces network traffic by eliminating redundant information from multiple hypervisor reporters that generate reports about the same hypervisors. The examples also substantially reduce processing of the monitoring node by eliminating the need to consolidate redundant information received from multiple hypervisor reporters that report on the same hypervisors. Moreover, the examples greatly facilitate the scalability of hypervisors and virtual machines controlled by the hypervisors.

In one example a method is provided that includes receiving, by a computing device comprising a processor device, a first communication from a first hypervisor reporter that identifies a first hypervisor as a hypervisor about which the first hypervisor reporter can generate reports over time. The method further includes determining that no other hypervisor reporter is a current authority for the first hypervisor. The method further includes designating the first hypervisor reporter as a current authority for the first hypervisor. The method further includes requesting, from the first hypervisor reporter, a first full report about the first hypervisor.

In another example a computing device is provided. The computing device includes a memory and a processor device coupled to the memory. The processor device is to receive a first communication from a first hypervisor reporter that identifies a first hypervisor as a hypervisor about which the first hypervisor reporter can generate reports over time. The processor device is further to determine that no other hypervisor reporter is a current authority for the first hypervisor. The processor device is further to designate the first hypervisor reporter as the current authority for the first hypervisor. The processor device is further to request, from the first hypervisor reporter, a first full report about the first hypervisor.

In another example a computer program product stored on a non-transitory computer-readable storage medium is provided. The computer program product includes instructions that cause a processor device to receive a first communication from a first hypervisor reporter that identifies a first hypervisor as a hypervisor about which the first hypervisor reporter can generate reports over time. The instructions further cause the processor device to determine that no other hypervisor reporter is a current authority for the first hypervisor. The instructions further cause the processor device to designate the first hypervisor reporter as the current authority for the first hypervisor. The instructions further cause the processor device to request, from the first hypervisor reporter, a first full report about the first hypervisor.

In another example a method for notifying a monitoring node about a hypervisor is provided. The method includes identifying, by a hypervisor reporter executing on a computing device comprising a processing device, a first hypervisor about which the hypervisor reporter is capable of generating a report. The method further includes sending, to a monitoring node, a communication that identifies the first hypervisor. The method further includes receiving, from the monitoring node, a first report request that comprises one of a request to send a full report about the first hypervisor and a request to provide no reports about the first hypervisor.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
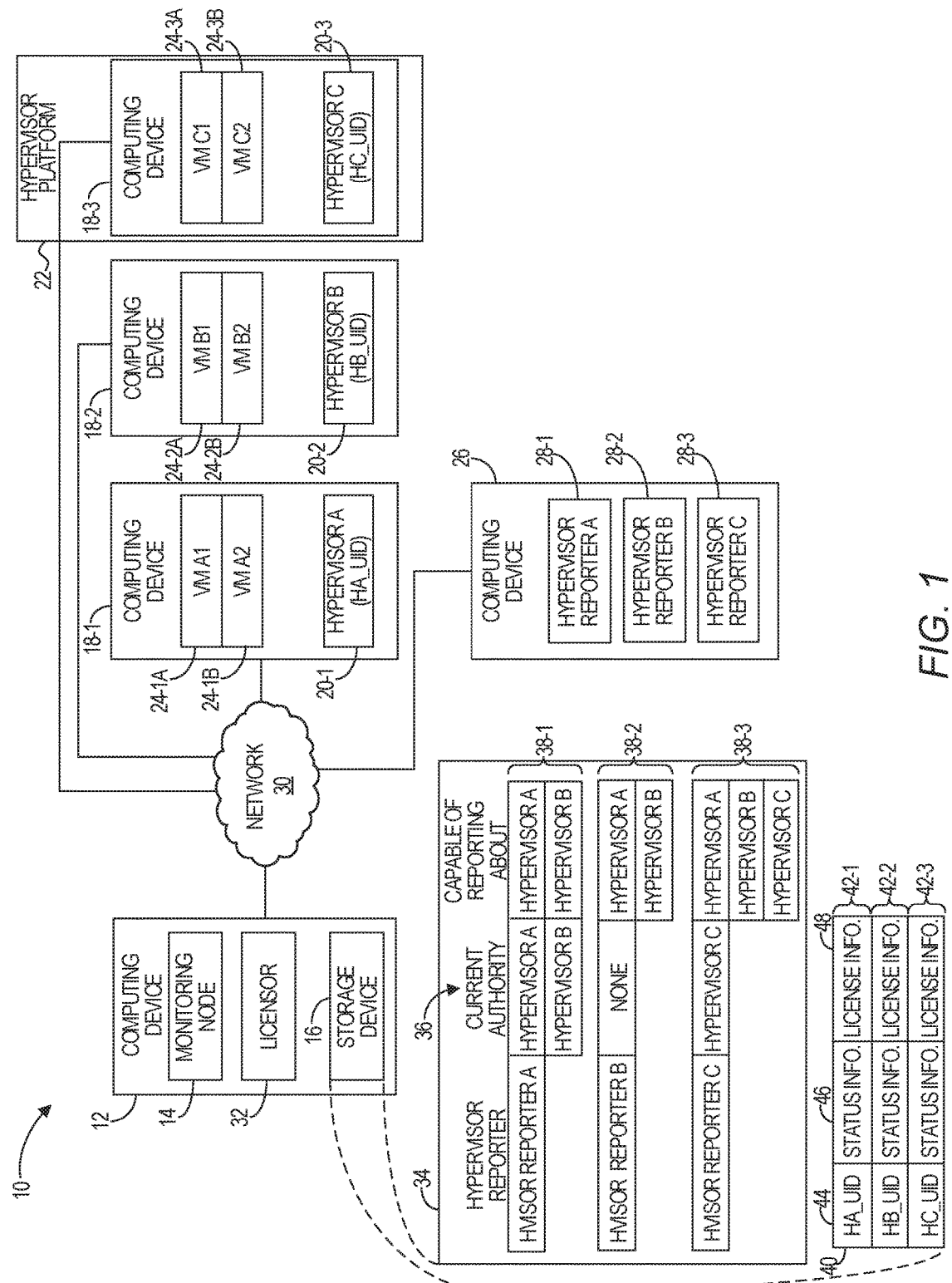
FIG. 1 is a block diagram of a virtualization environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first hypervisor reporter" and "second hypervisor reporter," and does not imply a priority, a type, an importance, or other attribute, unless otherwise stated herein. As used herein and in the claims, the articles "a" and "an" in reference to an element refers to "one or more" of the element unless otherwise explicitly specified.

Computing environments increasingly utilize virtualization technology that facilitates a large number of independent processing instances, such as virtual machines. Each virtual machine is associated with a particular hypervisor that initiated the virtual machine and which manages and otherwise controls the virtual machine. Hypervisors, in turn, execute on a computing device, sometimes referred to as a "host" or a "host machine." In some environments, a host machine executes a single hypervisor, while in other environments, a host machine may execute multiple hypervisors.

In many situations it is desirable or necessary to maintain accurate information regarding which virtual machines are implemented on which hypervisors. For example, software licenses may be inheritable via a hypervisor, and thus knowing which virtual machines are associated with which hypervisors may be necessary to ensure the virtual machines are appropriately licensed. Or, for example, software licenses may be based on the number of concurrently running virtual machines associated with one or more hypervisors, and thus maintaining a count of the number of concurrently running virtual machines is desirable to enforce such licenses.

Reporting processes, referred to herein as hypervisor reporters, are capable of generating reports about hypervisors and the virtual machines associated with such hypervisors, and report such information to a monitoring node. Hypervisor reporters are often preconfigured to report on hypervisors in a manner that results in multiple hypervisor reporters generating reports about the same hypervisor, or hypervisors. In relatively large environments, hundreds, thousands, or tens of thousands of virtual machines may be concurrently running. A report generated by a hypervisor reporter in such an environment can contain a substantial amount of data, because the report may identify each virtual machine associated with each hypervisor, as well as metadata associated with the virtual machines, such as a status of the virtual machine, and the like. If the monitoring node receives multiple reports from multiple hypervisor reporters about the same hypervisor, the monitoring node must consolidate the information so that redundant information is not maintained and so that information about virtual machines and associated hypervisors is accurate. This consolidation process takes time, and utilizes processing cycles of a processing device that are consequently not available for other functions.

Because the hypervisor reporters generate such reports periodically, and/or in response to the occurrence of certain events, the successive reports may contain a substantial amount of information that is redundant to information sent in one or more previous reports. Multiple reports regarding the same hypervisors and virtual machines utilize network bandwidth needlessly.

As will be discussed in greater detail below, the examples provide a monitoring node that identifies a particular hypervisor reporter from a plurality of hypervisor reporters as a current authority for each hypervisor. All other hypervisor reporters that are capable of reporting about the respective hypervisor are instructed not to send reports about the hypervisor. The particular hypervisor reporter is requested to initially provide a full report about the hypervisor that identifies all the virtual machines associated with the hypervisor. The particular hypervisor reporter is subsequently requested to send only differential reports that identify a difference between the previous state of the hypervisor and a subsequent state of the hypervisor.

The examples disclosed herein implement efficient hypervisor reporting that substantially reduces network traffic by eliminating redundant information from multiple hypervisor reporters that report about the same hypervisors. The examples also substantially reduce processing of the monitoring node by eliminating the need to consolidate redundant information received from multiple hypervisor reporters that report about the same hypervisors. Moreover, the examples greatly facilitate scalability of hypervisors and virtual machines controlled by the hypervisors.

FIG. 1 is a block diagram of a virtualization environment 10 in which examples may be practiced. The virtualization environment 10 includes a computing device 12 on which a monitoring node 14 executes. The computing device 12 also includes a storage device 16. The virtualization environment 10 also includes a plurality of computing devices 18-1-18-3 (generally, computing devices 18). While for purposes of illustration only three computing devices 18 are shown, the virtualization environment 10 could, in practice, have tens, hundreds or thousands of computing devices 18.

Each computing device 18-1-18-3 includes a corresponding hypervisor 20-1-20-3 (generally, hypervisor 20 or hypervisors 20). Each hypervisor 20 is configured to initiate and control one or more virtual machines (VM). Each VM runs a dedicated operating system, and different VMs on the same computing device 18 may run different operating systems. The hypervisors 20 may comprise any suitable hypervisors, including, by way of non-limiting example, Red Hat® Enterprise Virtualization (RHEV), Xen/Citrix® XenServer, or the like. In some examples, one or more hypervisors 20 may be part of a hypervisor framework 22, such as, by way of non-limiting example, Microsoft® Windows Hyper-V or VMware® vSphere/ESXi.

As an example, the hypervisor 20-1 is associated with VMs 24-1A-24-1B, the hypervisor 20-2 is associated with VMs 24-2A-24-2B, and the hypervisor 20-3 is associated with VMs 24-3A-24-3B. The phrase "associated with" in this context means that the VM is initiated by the hypervisor 20 with which the VM 24 is associated. The VMs 24-1A, 24-1B, 24-2A, 24-2B, and 24-3A, 24-3B may be referred to herein generally as the VMs 24.

While for purposes of illustration only three hypervisors 20 are shown, the virtualization environment 10 could, in practice, have tens, hundreds or thousands of hypervisors 20. Similarly, while for purposes of illustration each hypervisor 20 is shown as having two associated VMs 24, in practice, each hypervisor 20 could have any number of associated VMs 24, such as tens, hundreds, or thousands of VMs 24.

The virtualization environment 10 also includes a computing device 26 on which a plurality of hypervisor reporters 28-1-28-3 (generally, hypervisor reporters 28) execute. The hypervisor reporters 28 are illustrated as executing on a single computing device 26, but in practice the hypervisor reporters 28 may execute on any number of computing devices, such as each may execute on its own computing device 26, or may execute on one or more of the computing devices 18, or may execute on the computing device 12. As will be discussed in greater detail below, each hypervisor reporter 28 is configured to generate reports about one or more hypervisors 20 over time that identify a status of the hypervisor 20. The term "status" in this context refers to information about a hypervisor 20 as well as the VMs 24 associated with the hypervisor 20. The computing device 12, computing devices 18, and the computing device 26 may communicate with one another, as discussed in greater detail below, via, for example, one or more public or private networks 30.

The hypervisor reporters 28, after initiation, identify hypervisors 20 about which the respective hypervisor reporters 28 are capable of generating a report. In one example, the hypervisor reporters 28 identify such hypervisors 20 via respective configuration options and/or may identify such hypervisors 20 via scanning the processes executing on one or more of particular computing devices 18 that are identified in such configuration options. For example, each of the hypervisor reporters 28 may have a respective configuration file that identifies one or more of the computing devices 18-1-18-3, and, after initiation, may scan the tasks executing on the computing devices 18-1-18-3 to determine whether any hypervisors 20 are executing. The hypervisor reporters 28 interact with the hypervisors 20 to identify the VMs 24 that are associated with the hypervisors 20. In the example of a hypervisor framework 22, the respective hypervisor reporter 28 may interact with the hypervisor framework 22 to learn about the hypervisors 20 that are part of the hypervisor framework 22, as well as the VMs 24 associated with such hypervisors 20. While the hypervisor reporters 28 may comprise any suitable reporting agent, in one example, certain base functionality of the hypervisor reporters 28 can be implemented by that of the Red Hat® Virtualization Agent (virt-who), available from Red Hat, Inc., 100 E Davie St, Raleigh, N.C. 27601.

It is noted that because the hypervisor reporters 28, in operation, are components of some computing device (in this example the computing device 26), functionality implemented by a hypervisor reporter 28 may be attributed to the computing device 26 generally. Moreover, in examples where the hypervisor reporter 28 comprises software instructions that program a processor device of the computing device 26 to carry out functionality discussed herein, functionality implemented by a hypervisor reporter 28 may be attributed herein to such processor device.

In the disclosed examples, the hypervisor reporters 28 generate reports about the hypervisors 20 under the control of the monitoring node 14. The monitoring node 14 maintains, via such reports, information about the hypervisors 20 and the VMs 24. Such information may be used in the virtualization environment 10 for any number of reasons. By way of non-limiting example, information about the hypervisors 20 and the VMs 24 may be used for software licensing purposes. For example, the monitoring node 14, or a separate process such as a licensor 32, may utilize such information to grant, retract, and otherwise control software licensing of the VMs 24. It is noted that because the monitoring node 14 is a component of the computing device 12, functionality implemented by the monitoring node 14 may be attributed to the computing device 12 generally. Moreover, in examples where the monitoring node 14 comprises software instructions that program a processor device of the computing device 12 to carry out functionality discussed herein, functionality implemented by the monitoring node 14 may be attributed herein to such processor device.

In a conventional virtualization environment, multiple hypervisor reporters 28 may generate reports about the same hypervisors 20. For example, the hypervisor reporter 28-1 may generate reports about the hypervisors 20-1, 20-2, the hypervisor reporter 28-2 may generate reports about the hypervisors 20-1, 20-2, and the hypervisor reporter 28-3 may generate reports about the hypervisors 20-1, 20-2, and 20-3. In such conventional virtualization environments, the monitoring node 14 must consolidate such information prior to storing such information in the storage device 16 to maintain accurate, non-redundant information regarding the hypervisors 20 and the VMs 24. In relatively large virtualization environments that have hundreds or thousands of VMs 24, such as, by way of non-limiting example, a cloud computing environment, such consolidation can be processor intensive and time-consuming. Moreover, in such a virtualization environment such reports can be relatively large, and utilize a substantial amount of the bandwidth of the network 30.

The examples disclosed herein substantially reduce or eliminate the need to consolidate reports from the hypervisor reporters 28, and greatly reduce the size of reports from the hypervisor reporters 28. In particular, the monitoring node 14 maintains information 34 that identifies, for each hypervisor 20, a particular hypervisor reporter 28 that is designated as a current authority 36 and is thus responsible for reporting about the respective hypervisor 20. The information 34 also identifies, for each hypervisor reporter 28, the hypervisors 20 about which the respective hypervisor reporters 28 are capable of generating reports. The monitoring node 14 sends information to each hypervisor reporter 28 that is capable of generating a report about a hypervisor 20 but is not the current authority for the hypervisor 20 that instructs the hypervisor reporter 28 to provide no reports about the respective hypervisor 20.

The information 34 changes over time based on various events, as will be discussed in greater detail below. Thus, the current authority 36 for a respective hypervisor 20 may change over time. Moreover, the hypervisors 20 for which a hypervisor reporter 28 is the current authority 36 may change over time. At the instant in time illustrated in FIG. 1, a record 38-1 indicates that the hypervisor reporter 28-1 ("HYPE RVISOR REPORTER A") is the current authority 36 for the hypervisor 20-1 ("HYPE RVISOR A") and the hypervisor 20-2 ("HYPERVISOR B"), and is capable of reporting about the hypervisor 20-1 and the hypervisor 20-2 (i.e., the hypervisor reporter 28-1 is not capable of reporting about the hypervisor 20-3 ("HYPERVISOR C") at the instant in time illustrated in FIG. 1).

A record 38-2 indicates that the hypervisor reporter 28-2 ("HYPERVISOR REPORTER B") is the current authority 36 for no hypervisors 20, and is capable of reporting about the hypervisor 20-1 and the hypervisor 20-2 (i.e., the hypervisor reporter 28-2 is not capable of reporting about the hypervisor 20-3 at the instant in time illustrated in FIG. 1). A record 38-3 indicates that the hypervisor reporter 28-3 ("HYPE RVISOR REPORTER C") is the current authority 36 for the hypervisor 20-3, and is capable of reporting about the hypervisors 20-1, 20-2 and 20-3.

The monitoring node 14 generates information 40 based on the reports received from the hypervisor reporters 28. The information 40 may include, for example, a record 42-1-42-3 that corresponds to each hypervisor 20-1-20-3. The record 42-1 may include, for example, an identifier 44 that uniquely identifies the respective hypervisor 20-1. The record 42-1 includes status info 46 that identifies the status of the hypervisor 20-1 at the instant of time of FIG. 1. By way of non-limiting example, the status info 46 may include identifiers that identify the VMs 24-1A and 24-2A, and metadata associated with the hypervisor 20-1 and that of the VMs 24-1A and 24-2A, such as a current state of the VMs 24-1A and 24-2A. For example, a state of the VMs 24-1A and 24-2A may be "paused," "running," "stopping," or the like.

License information 48 may maintain software licensing information about the hypervisor 20-1, such as an available number of software licenses for VMs 24 initiated by the hypervisor 20-1. In one example, based on the status information 46, the monitoring node 14 or the licensor 32 may, for example, associate a subscription with the hypervisor 20-1 that provides the necessary software license rights to the VMs 24-1A, 24-2A. The monitoring node 14 or the licensor 32 may also, for example, deduct an appropriate number of entitlements from a value that identifies a number of remaining software licenses for the hypervisor 20-1 based on the number of VMs 24 associated with the hypervisor 20-1 at the instant in time of FIG. 1. In another example, the monitoring node 14 or the licensor 32 may also revoke a subscription for a hypervisor 20 after it is determined that the hypervisor 20 is no longer executing.

Figure 2:
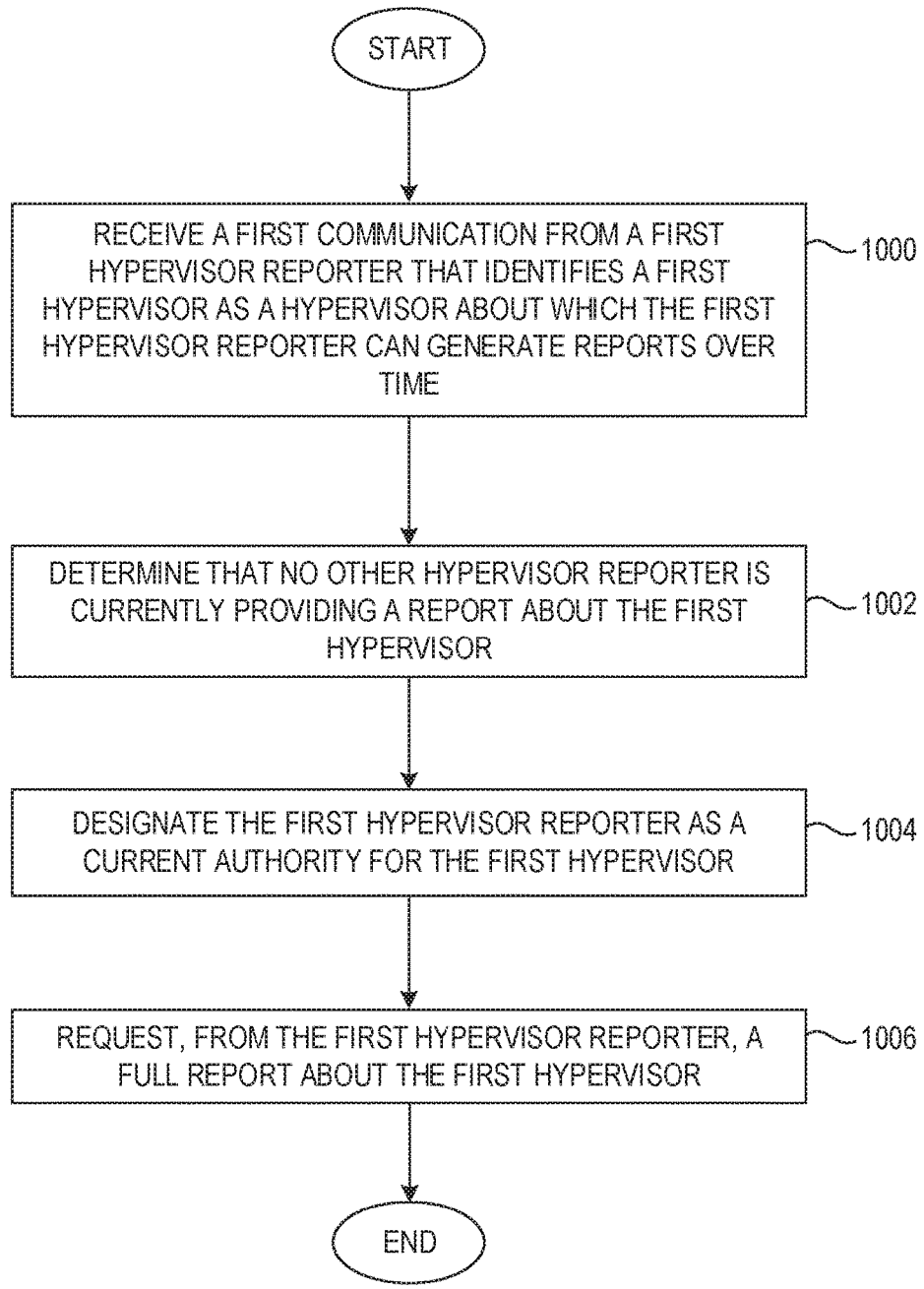
FIG. 2 is a flowchart of a method for designating a hypervisor reporter as a current authority for a hypervisor according to one example.

FIG. 2 is a flowchart of a method for designating a hypervisor reporter 28 as the current authority 36 for the hypervisor 20 according to one example. FIG. 2 will be discussed in conjunction with FIG. 1, however, assume for purposes of illustration that the virtualization environment 10 is at a point in time prior to the point in time illustrated in FIG. 1, and thus that the information 34 is empty and that the status of the hypervisor reporters 28 and the VMs 24 is different from that illustrated in FIG. 1. In particular, the hypervisor 20-1 and VMs 24-1A, 24-1B are executing, but the hypervisors 20-2, 20-3, and VMs 24-2A, 24-2B, VMs 24-3A, and 24-3B are not yet executing.

The hypervisor reporter 28-1 is initiated, and identifies the hypervisor 20-1 as a hypervisor about which the hypervisor reporter 28-1 is capable of generating a report. The hypervisor reporter 28-1 may be initiated manually, such as by an operator, or automatically in response to one or more events, such as the initiation of the hypervisor 20-1. Upon initiation, the hypervisor reporter 28-1 may, for example, access a configuration file that identifies the computing device 18-1 as a computing device which the hypervisor reporter 28-1 should scan to determine whether one or more hypervisors 20 are executing. The hypervisor reporter 28-1 scans the computing device 18-1 and identifies the hypervisor 20-1. The configuration file may also identify the computing device 18-2 as a computing device which the hypervisor reporter 28-1 should scan to determine whether one or more hypervisors 20 are executing. The hypervisor reporter 28-1 scans the computing device 18-2 and, in accordance with the assumptions above, determines that no hypervisors 20 are currently executing on the computing device 18-2.

The monitoring node 14 receives, from the hypervisor reporter 28-1, a first communication that identifies the hypervisor 20-1 as a hypervisor about which the hypervisor reporter 28-1 can generate reports over time (FIG. 2, block 1000). The monitoring node 14 accesses the information 34 and determines that no other hypervisor reporter 28 is currently providing a report about the hypervisor 20-1 (FIG. 2, block 1002). The monitoring node 14 designates the hypervisor reporter 28-1 as the current authority 36 for the hypervisor 20-1 (FIG. 2, block 1004). The monitoring node 14 requests, from the hypervisor reporter 28-1, a full report about the hypervisor 20-1 (FIG. 2, block 1006).

Figure 3A:
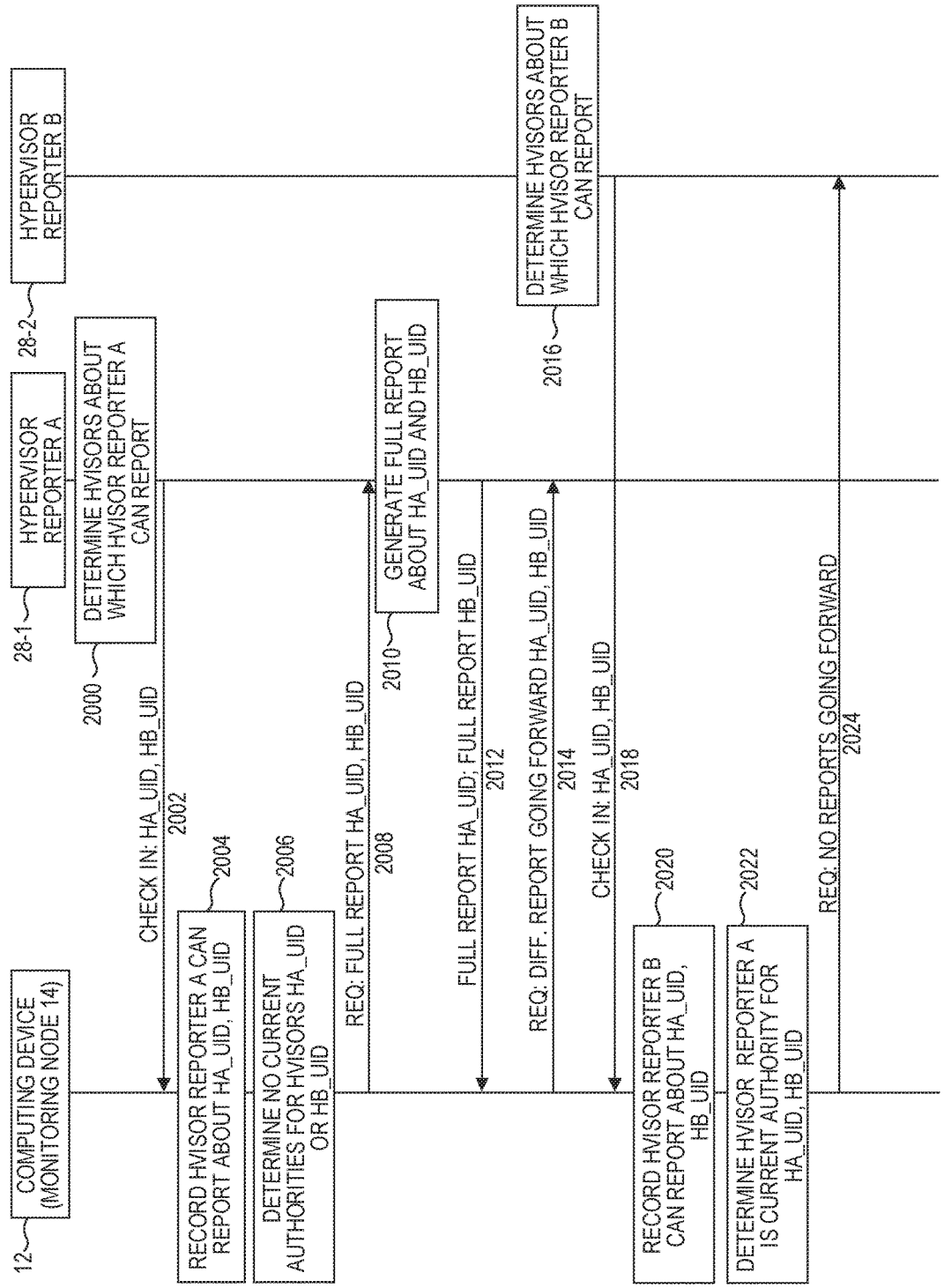
FIGS. 3A-3B are message flow diagrams illustrating example messages and processing that may occur in a virtualization environment according to one example.
Figure 3B:
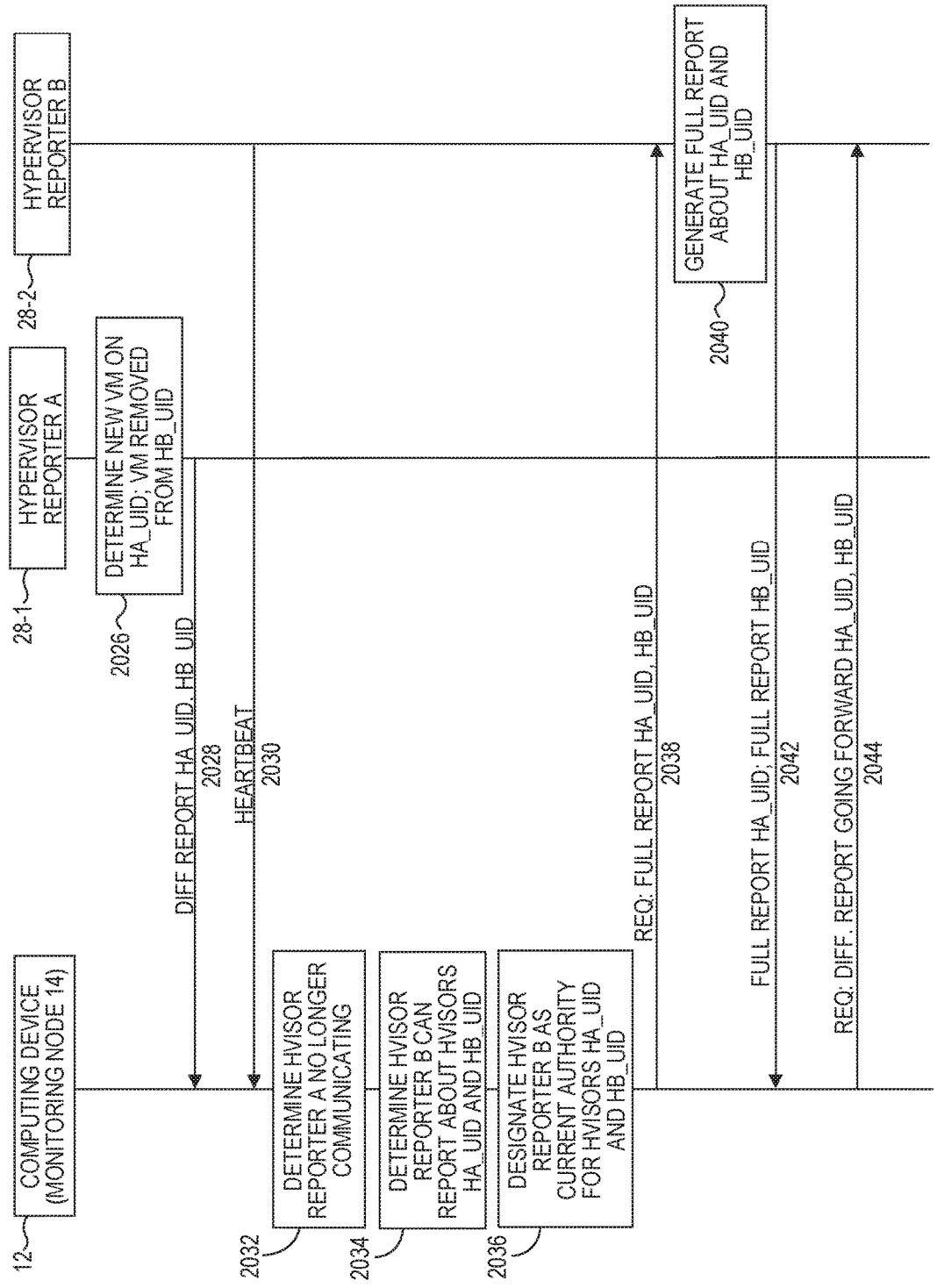

FIGS. 3A-3B are message flow diagrams illustrating example messages and processing that may occur in a virtualization environment according to one example. FIGS. 3A-3B will be discussed in conjunction with FIG. 1, but in this example, assume that the virtualization environment 10 does not include the hypervisor reporter 28-3 or the hypervisor framework 22, that the information 34 is initially empty, and that the hypervisors 20-1, 20-2 and the VMs 24-1A, 24-2A, 24-1B and 24-2B are all executing. The hypervisor reporter 28-1 initiates, and in this example is configured to scan the computing devices 18-1, 18-2 to determine whether any hypervisors 20 are executing on the computing devices 18-1, 18-2. The hypervisor reporter 28-1 scans the computing devices 18-1, 18-2 and identifies the hypervisors 20-1, 20-2 as hypervisors about which the hypervisor reporter 28-1 is capable of generating a report (step 2000). The hypervisor reporter 28-1 sends a communication to the monitoring node 14 that identifies the hypervisors 20-1 (step 2002).

The monitoring node 14 stores information 34 that identifies the hypervisor reporter 28-1 as being capable of reporting about the hypervisors 20-1, 20-2 (step 2004). The monitoring node 14, via the information 34, determines that no other hypervisor reporter 28 is the current authority 36 for the hypervisors 20-1, 20-2 (step 2006). The monitoring node 14 requests, from the hypervisor reporter 28-1 a full report about the hypervisors 20-1, 20-2 (step 2008).

The hypervisor reporter 28-1 generates a full report for each of the hypervisors 20-1, 20-2 (step 2010). In one example, in order to generate the full report, the hypervisor reporter 28-1 may request from the hypervisors 20-1, 20-2 information regarding the VMs 24 that are currently associated with the hypervisors 20-1, 20-2. The requests may be in the form of a command, or via a call to a predetermined application programming interface (API) offered by the hypervisors 20-1, 20-2. The hypervisor reporter 28-1 obtains the requested information from the hypervisors 20-1, 20-2 and sends the full reports to the monitoring node 14 (step 2012). The hypervisor reporter 28-1 may also store the full reports in a storage device or memory for subsequent determination of differences between the state of the hypervisors 20-1, 20-2 at the current time and the state of the hypervisors 20-1, 20-2 at a future time, to aid in the preparation of a differential report. The monitoring node 14 receives the full reports, each full report including the VMs 24 that are associated with the respective hypervisors 20-1, 20-2, and sends information to the hypervisor reporter 28-1 that requests that future reports about the hypervisors 20-1, 20-2 be differential reports that identify a difference between a previous state of the hypervisors 20-1, 20-2 and a subsequent state of the hypervisors 20-1, 20-2 (step 2014). The full report may include any desired information, such as, by way of non-limiting example, metadata about the hypervisors 20, and metadata about the VMs 24, such as the number of central processing unit cores for each VM 24, the memory assigned to each VM 24, and any other suitable information.

Assume that the hypervisor reporter 28-2 now initiates, and, like the hypervisor reporter 28-1, is configured to scan the computing devices 18-1, 18-2 to determine whether any hypervisors 20 are executing on the computing devices 18-1, 18-2. The hypervisor reporter 28-2 scans the computing devices 18-1, 18-2 and identifies the hypervisors 20-1, 20-2 as hypervisors about which the hypervisor reporter 28-2 is capable of generating a report (step 2016). The hypervisor reporter 28-2 sends a communication to the monitoring node 14 that identifies the hypervisors 20-1, 20-2 (step 2018). The monitoring node 14 stores information 34 that identifies the hypervisor reporter 28-2 as being capable of reporting about the hypervisors 20-1, 20-2 (step 2020). The monitoring node 14, via the information 34, determines that the hypervisor reporter 28-1 is the current authority 36 for the hypervisors 20-1, 20-2 (step 2022). Because a current authority 36 for the hypervisors 20-1, 20-2 already exists, the monitoring node 14 sends information to the second hypervisor reporter 28-2 that instructs the second hypervisor reporter 28-2 to provide no reports about the first hypervisor (step 2024).

Assume that the hypervisor reporter 28-1 now learns about the initiation of a new VM 24 by the hypervisor 20-1, and the removal of a VM 24 that was associated with the hypervisor 20-2 (step 2026). The hypervisor reporter 28-1 may learn about such changes, for example, by periodically or intermittently polling the hypervisors 20-1, 20-2 at a current time and comparing the status to a previously determined status that was determined at a previous time. In some examples the hypervisor reporter 28-1 may poll the hypervisors 20-1, 20-2 every second, or every two seconds, or at any other desirable period. In other examples, the hypervisor reporter 28-1 may provide callbacks to the hypervisors 20-1, 20-2, which are invoked by the hypervisors 20-1, 20-2 when any change in the status of the respective hypervisors 20-1, 20-2 occurs. In some examples, the hypervisors 20-1, 20-2 may identify the particular change, such as the addition or removal of a VM 24, or a change in status of a VM 24, when invoking the callback, and thereby eliminate a need for the hypervisor reporter 28-1 to periodically poll the hypervisors 20-1, 20-2. The hypervisor reporter 28-1 generates differential reports for the hypervisors 20-1, 20-2 and sends the differential reports to the monitoring node 14 (step 2028). Note that sending the differential report reduces the bandwidth of the network 30 that would otherwise by utilized if a full report was sent.

Each differential report identifies the difference between the previous state of the hypervisors 20-1, 20-2 at the previous time and a subsequent state of the hypervisors 20-1, 20-2 at the current time. The differences may include, for example, information that identifies any additional VMs 24 associated with the hypervisors 20-1, 20-2 since the previous time, information that identifies any VMs 24 that were associated with the hypervisors 20-1, 20-2 at the previous time but are no longer associated with the hypervisors 20-1, 20-2, information that identifies any change in status of a VM 24 associated with the hypervisors 20-1, 20-2, and the like.

Periodically, the hypervisor reporter 28-2 may send the monitoring node 14 a "heartbeat" communication indicating that the hypervisor reporter 28-2 is still executing and communicating (step 2030). Such heartbeat communication may include, in one example, the list of hypervisors 20 about which the hypervisor reporter 28-2 is capable of generating a report. In other examples, the heartbeat communication may not include such information. The time of the most recent heartbeat communication received by the monitoring node 14 for each hypervisor reporter 28 may be maintained, for example, in the information 34. Heartbeat communications may be sent by hypervisor reporters 28 after a predetermined time, or sent periodically if the hypervisor reporters 28 have no other reason to communicate with the monitoring node 14.

Assume that the monitoring node 14 subsequently determines that the hypervisor reporter 28-1 is no longer communicating (step 2032). This may occur, for example, because the hypervisor reporter 28-1 faulted, because an operator inadvertently or intentionally terminated the hypervisor reporter 28-1, or for any number of reasons. In one example, the monitoring node 14 may maintain a timer that is reset each time the hypervisor reporter 28-1 faults, and each time the hypervisor reporter 28-1 sends a heartbeat communication that indicates that the hypervisor reporter 28-1 is still active. If the timer expires, the monitoring node 14 determines that the hypervisor reporter 28-1 is no longer communicating.

The monitoring node 14 accesses the information 34 and determines that the hypervisor reporter 28-2 is capable of reporting about the hypervisors 20-1, 20-2 (step 2034). The monitoring node 14 designates, in the information 34, the hypervisor reporter 28-2 as the current authority 36 for the hypervisors 20-1, 20-2, and removes the information about the hypervisor reporter 28-1 from the information 34 (step 2036). The monitoring node 14 requests, from the second hypervisor reporter 28-2, a full report about the hypervisors 20-1, 20-2 (step 2038). The hypervisor reporter 28-2 obtains the status of the hypervisors 20-1, 20-2 and generates a full report for each of the hypervisors 20-1, 20-2 (step 2040). The hypervisor reporter 28-2 sends the full reports to the monitoring node 14 (step 2042). The hypervisor reporter 28-2 may also store the full reports in a storage device or memory for subsequent determination of differences between the state of the hypervisors 20-1, 20-2 at the current time and the state of the hypervisors 20-1, 20-2 at a future time, to aid in the preparation of a differential report. The monitoring node 14 receives the full reports, each full report including the VMs 24 that are associated with the respective hypervisors 20-1, 20-2, and sends information to the hypervisor reporter 28-2 that requests that future reports about the hypervisors 20-1, 20-2 be differential reports that identify a difference between a previous state of the hypervisors 20-1, 20-2 and a subsequent state of the hypervisors 20-1, 20-2 (step 2044).

Figure 4A:
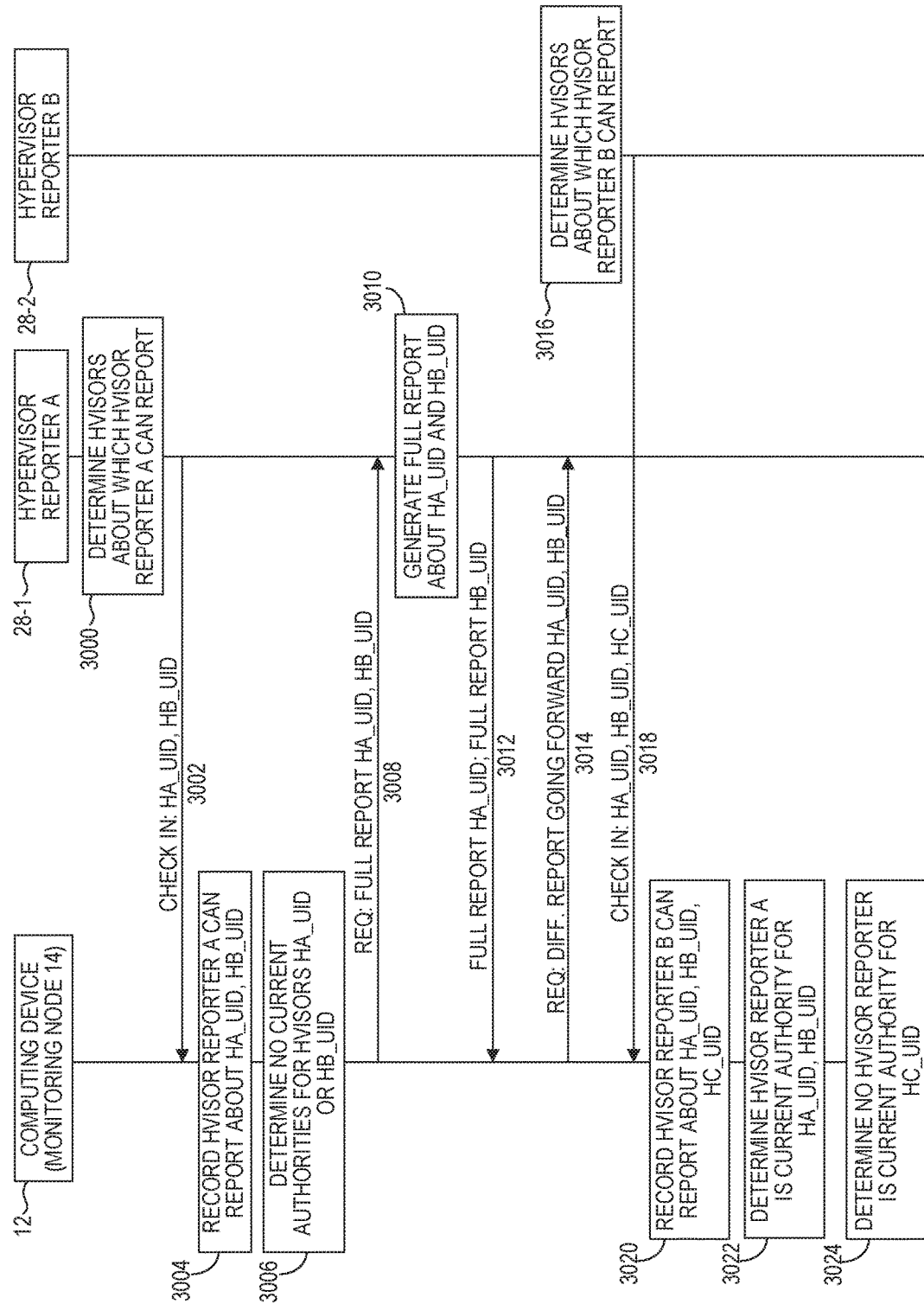
FIGS. 4A-4B are message flow diagrams illustrating example messages and processing that may occur in a virtualization environment according to another example.
Figure 4B:
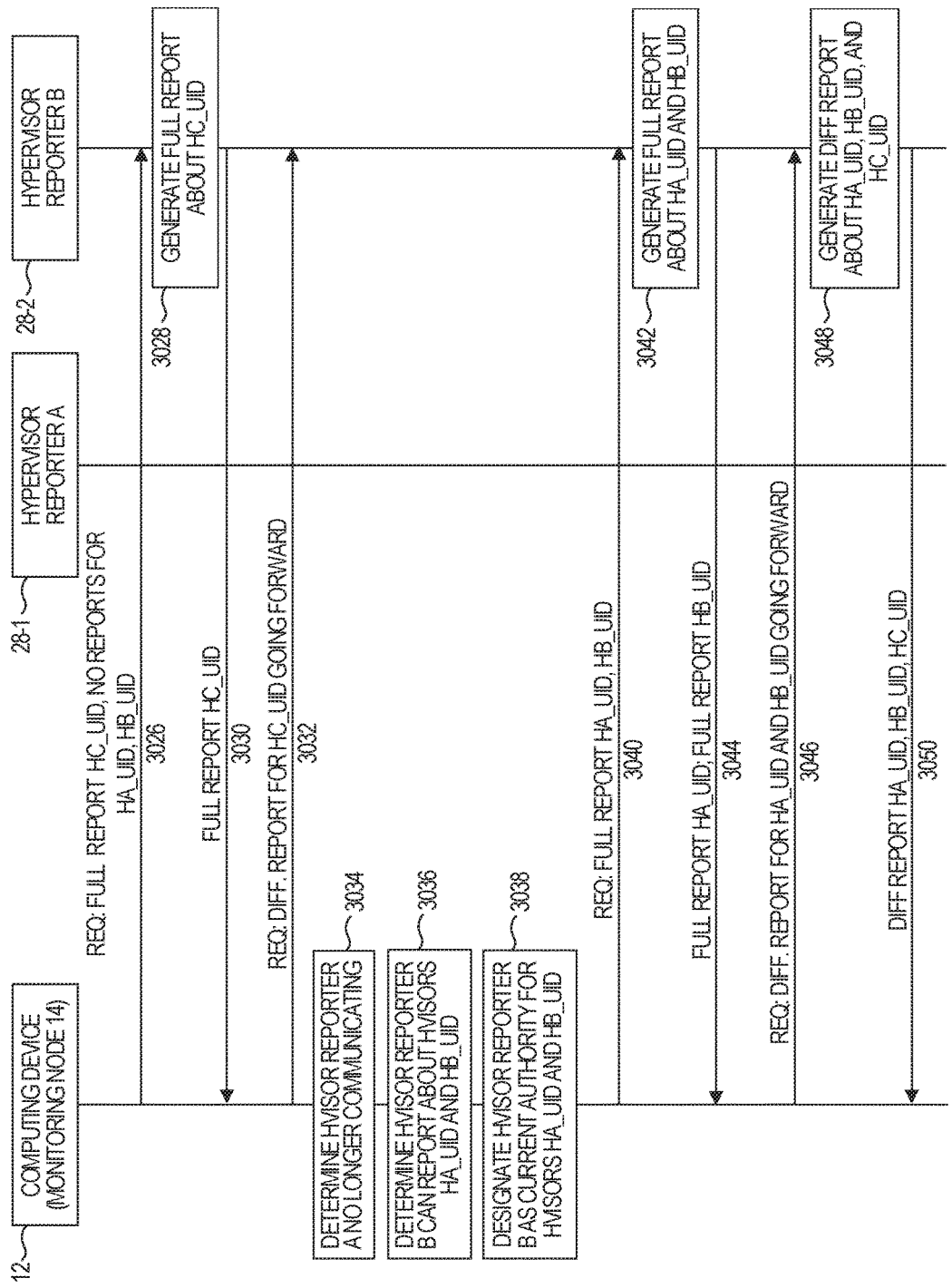

FIGS. 4A-4B are message flow diagrams illustrating example messages and processing that may occur in a virtualization environment 10 according to another example. FIGS. 4A-4B will be discussed in conjunction with FIG. 1, but in this example assume that the virtualization environment 10 does not include the hypervisor reporter 28-3, that the information 34 is initially empty, and that the hypervisors 20-1, 20-2, and 20-3, and the VMs 24-1A, 24-1B, 24-2A, 24-2B, 24-3A, 24-3B are all executing. The hypervisor reporter 28-1 initiates, and in this example is configured to scan the computing devices 18-1, 18-2 to determine whether any hypervisors 20 are executing on the computing devices 18-1, 18-2. The hypervisor reporter 28-1 scans the computing devices 18-1, 18-2 and identifies the hypervisors 20-1, 20-2 as hypervisors about which the hypervisor reporter 28-1 is capable of generating a report (step 3000). The hypervisor reporter 28-1 sends a communication to the monitoring node 14 that identifies the hypervisors 20-1, 20-2 (step 3002). The monitoring node 14 stores information 34 that identifies the hypervisor reporter 28-1 as being capable of reporting about the hypervisors 20-1, 20-2 (step 3004). The monitoring node 14, via the information 34, determines that no other hypervisor reporter 28 is the current authority 36 for the hypervisors 20-1, 20-2 (step 3006). The monitoring node 14 requests, from the hypervisor reporter 28-1, a full report about the hypervisors 20-1, 20-2 (step 3008).

The hypervisor reporter 28-1 generates a full report for each of the hypervisors 20-1, 20-2 (step 3010). The hypervisor reporter 28-1 sends the full reports to the monitoring node 14 (step 3012). The hypervisor reporter 28-1 may also store the full reports in a storage device or memory for subsequent determination of differences between the state of the hypervisors 20-1, 20-2 at the current time and the state of the hypervisors 20-1, 20-2 at a future time, to aid in the preparation of a differential report. The monitoring node 14 receives the full reports, each full report including the VMs 24 that are associated with the respective hypervisors 20-1, 20-2, and sends information to the hypervisor reporter 28-1 that requests that future reports about the hypervisors 20-1, 20-2 be differential reports that identify a difference between a previous state of the hypervisors 20-1, 20-2 and a subsequent state of the hypervisors 20-1, 20-2 (step 3014).

Assume that the hypervisor reporter 28-2 now initiates, and is configured to scan the computing devices 18-1, 18-2 and 18-3 to determine whether any hypervisors 20 are executing on the computing devices 18-1, 18-2 and 18-3. The hypervisor reporter 28-2 scans the computing devices 18-1, 18-2 and 18-3 and identifies the hypervisors 20-1, 20-2 and 20-3 as hypervisors about which the hypervisor reporter 28-2 is capable of generating a report (step 3016). The hypervisor reporter 28-2 sends a communication to the monitoring node 14 that identifies the hypervisors 20-1, 20-2 and 20-3 (step 3018).

The monitoring node 14 stores information 34 that identifies the hypervisor reporter 28-2 as being capable of reporting about the hypervisors 20-1, 20-2 and 20-3 (step 3020). The monitoring node 14, via the information 34, determines that the hypervisor reporter 28-1 is the current authority 36 for the hypervisors 20-1, 20-2 (step 3022). The monitoring node 14, via the information 34, determines that no hypervisor reporter 28 is the current authority 36 for the hypervisor 20-3 (step 3024). Because a current authority 36 for the hypervisors 20-1, 20-2 already exists, and no hypervisor reporter 28 is the current authority 36 for the hypervisor 20-3, the monitoring node 14 sends information to the second hypervisor reporter 28-2 that instructs the second hypervisor reporter 28-2 to provide no reports about the hypervisors 20-1, 20-2, and to provide a full report about the hypervisor 20-3 (step 3026).

The hypervisor reporter 28-2 obtains the requested information from the hypervisor 20-3, generates a full report about the hypervisor 20-3, and sends the full report to the monitoring node 14 (steps 3028, 3030). Because the hypervisor 20-3 is part of a hypervisor framework 22, the hypervisor reporter 28-2 may obtain such information via the hypervisor framework 22 rather than directly from the hypervisor 20-3. The hypervisor reporter 28-2 may also store the full report in a storage device or memory for subsequent determination of differences between the state of the hypervisor 20-3 at the current time and the state of the hypervisor 20-3 at a future time, to aid in the preparation of a differential report. The monitoring node 14 receives the full report and sends information to the hypervisor reporter 28-2 that requests that future reports about the hypervisor 20-3 be differential reports that identify a difference between a previous state of the hypervisor 20-3 and a subsequent state of the hypervisor 20-3 (step 3032).

Assume that the monitoring node 14 subsequently determines that the hypervisor reporter 28-1 is no longer communicating (step 3034). This may occur, for example, because the hypervisor reporter 28-1 faulted, because an operator inadvertently or intentionally terminated the hypervisor reporter 28-1, or for any number of other reasons. The monitoring node 14 accesses the information 34 and determines that the hypervisor reporter 28-2 is capable of reporting about the hypervisors 20-1, 20-2 (step 3036). The monitoring node 14 designates, in the information 34, the hypervisor reporter 28-2 as the current authority 36 for the hypervisors 20-1, 20-2, and removes the information about the hypervisor reporter 28-1 from the information 34 (step 3038). The monitoring node 14 requests, from the second hypervisor reporter 28-2, a full report about the hypervisors 20-1, 20-2 (step 3040).

The hypervisor reporter 28-2 obtains the status of the hypervisors 20-1, 20-2 and generates a full report for each of the hypervisors 20-1, 20-2 (step 3042). The hypervisor reporter 28-2 sends the full reports to the monitoring node 14 (step 3044). The hypervisor reporter 28-2 may also store the full reports in a storage device or memory for subsequent determination of differences between the state of the hypervisors 20-1, 20-2 at the current time and the state of the hypervisors 20-1, 20-2 at a future time, to aid in the preparation of a differential report. The monitoring node 14 receives the full reports, each full report including the VMs 24 that are associated with the respective hypervisors 20-1, 20-2, and sends information to the hypervisor reporter 28-2 that requests that future reports about the hypervisors 20-1, 20-2 be differential reports that identify a difference between a previous state of the hypervisors 20-1, 20-2 and a subsequent state of the hypervisors 20-1, 20-2 (step 3046). At a subsequent point in time, the hypervisor reporter 28-2 generates differential reports for the hypervisors 20-1, 20-2 and 20-3, and sends the differential reports to the monitoring node 14 (steps 3048, 3050).

Figure 5:
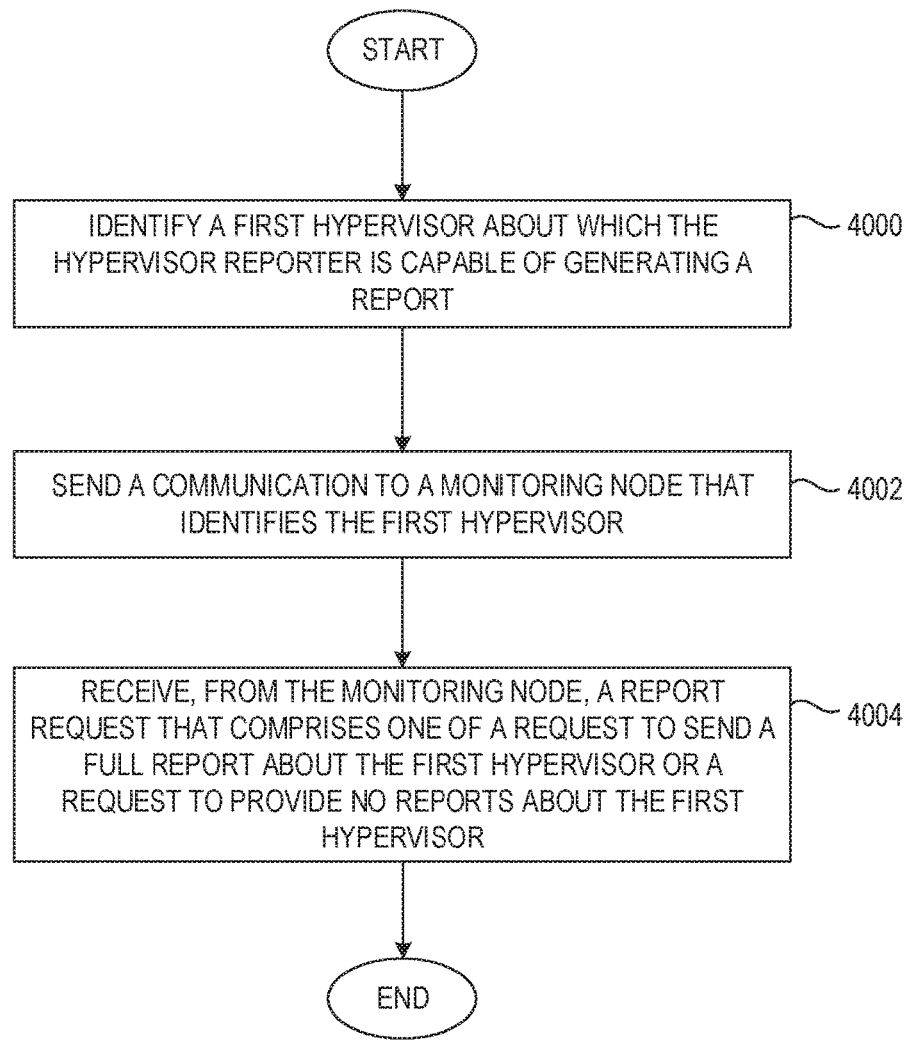
FIG. 5 is a flowchart of a method for notifying a monitoring node about a hypervisor according to one example.

FIG. 5 is a flowchart of a method for notifying a monitoring node about a hypervisor according to one example. FIG. 5 will be discussed in conjunction with FIG. 1. The hypervisor reporter 28-1 initiates, and, pursuant to a configuration file, scans the computing device 18-1 and identifies the hypervisor 20-1 as a hypervisor about which the hypervisor reporter 28-1 is capable of generating a report (block 5000). The hypervisor reporter 28-1 sends a communication to the monitoring node 14 that identifies the hypervisor 20-1 (block 5002). The hypervisor reporter 28-1 receives, from the monitoring node 14, a report request that is either a request to send a full report about the hypervisor 20-1, or a request to provide no reports about the hypervisor 20-1, depending on whether a current authority 36 already exists for the hypervisor 20-1 (block 5004).

Figure 6:
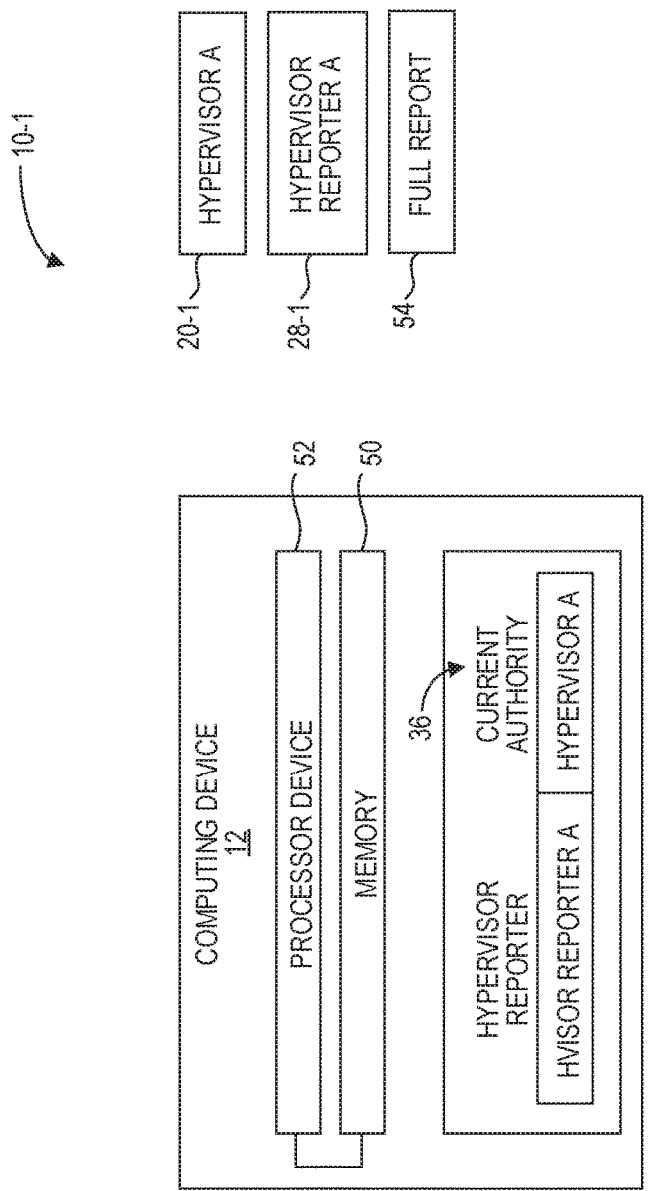
FIG. 6 is a block diagram of a virtualization environment that is a simplified version of the virtualization environment illustrated in FIG. 1, according to one example.

FIG. 6 is a block diagram of a virtualization environment 10-1, which is a simplified version of the virtualization environment 10 illustrated in FIG. 1, according to one example. The virtualization environment 10-1 includes the computing device 12, which includes a memory 50 and a processor device 52. The processor device 52 is coupled to the memory 50 to receive a communication from the hypervisor reporter 28-1 that identifies the hypervisor 20-1 as a hypervisor about which the hypervisor reporter 28-1 can generate reports over time. The processor device 52 is further to determine that no other hypervisor reporter 28 is currently providing a report about the hypervisor 20-1. The processor device 52 is further to designate the hypervisor reporter 28-1 as the current authority 36 for the hypervisor 20-1, and request, from the hypervisor reporter 28-1, a full report 54 about the hypervisor 20-1.

Figure 7:
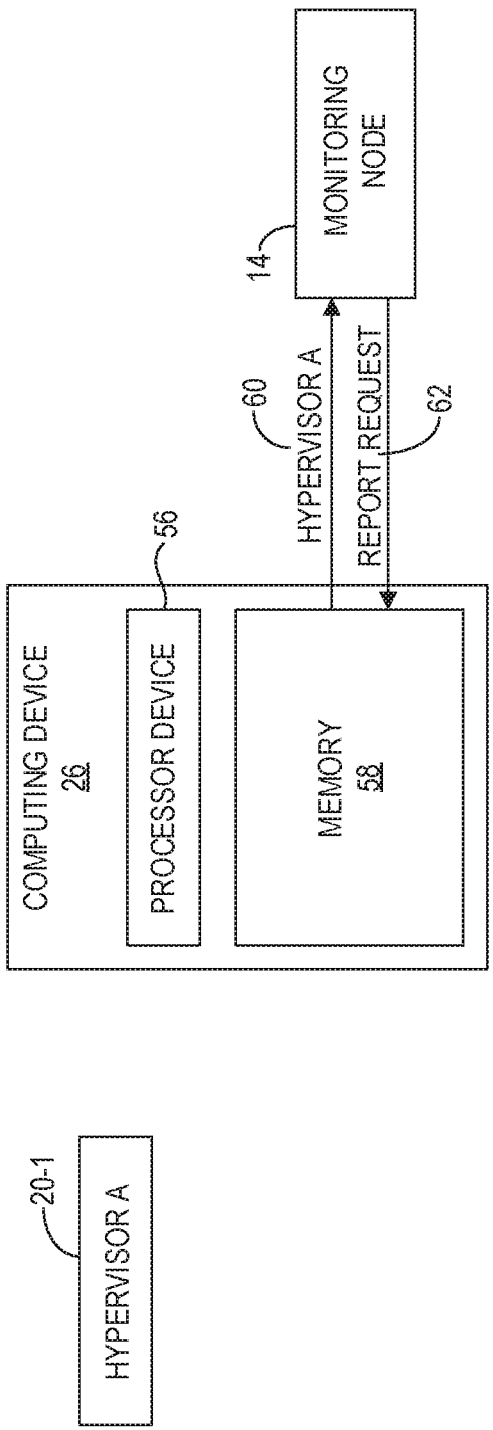
FIG. 7 is a block diagram of a virtualization environment that is a second simplified version of the virtualization environment illustrated in FIG. 1, according to one example.

FIG. 7 is a block diagram of a virtualization environment 10-2 which is a second simplified version of the virtualization environment 10 illustrated in FIG. 1, according to one example. The computing device 26 includes a processor device 56 coupled to a memory 58. The processor device 56 is to identify the hypervisor 20-1 about which the processor device 56 is capable of generating a report. The processor device 56 is further to send a communication 60 to the monitoring node 14 that identifies the hypervisor 20-1. The processor device 56 receives, from the monitoring node 14, a report request 62 that is a request to send a full report about the hypervisor 20-1 or a request to provide no reports about the hypervisor 20-1, depending on whether or not a current authority 36 exists for the hypervisor 20-1.

Figure 8:
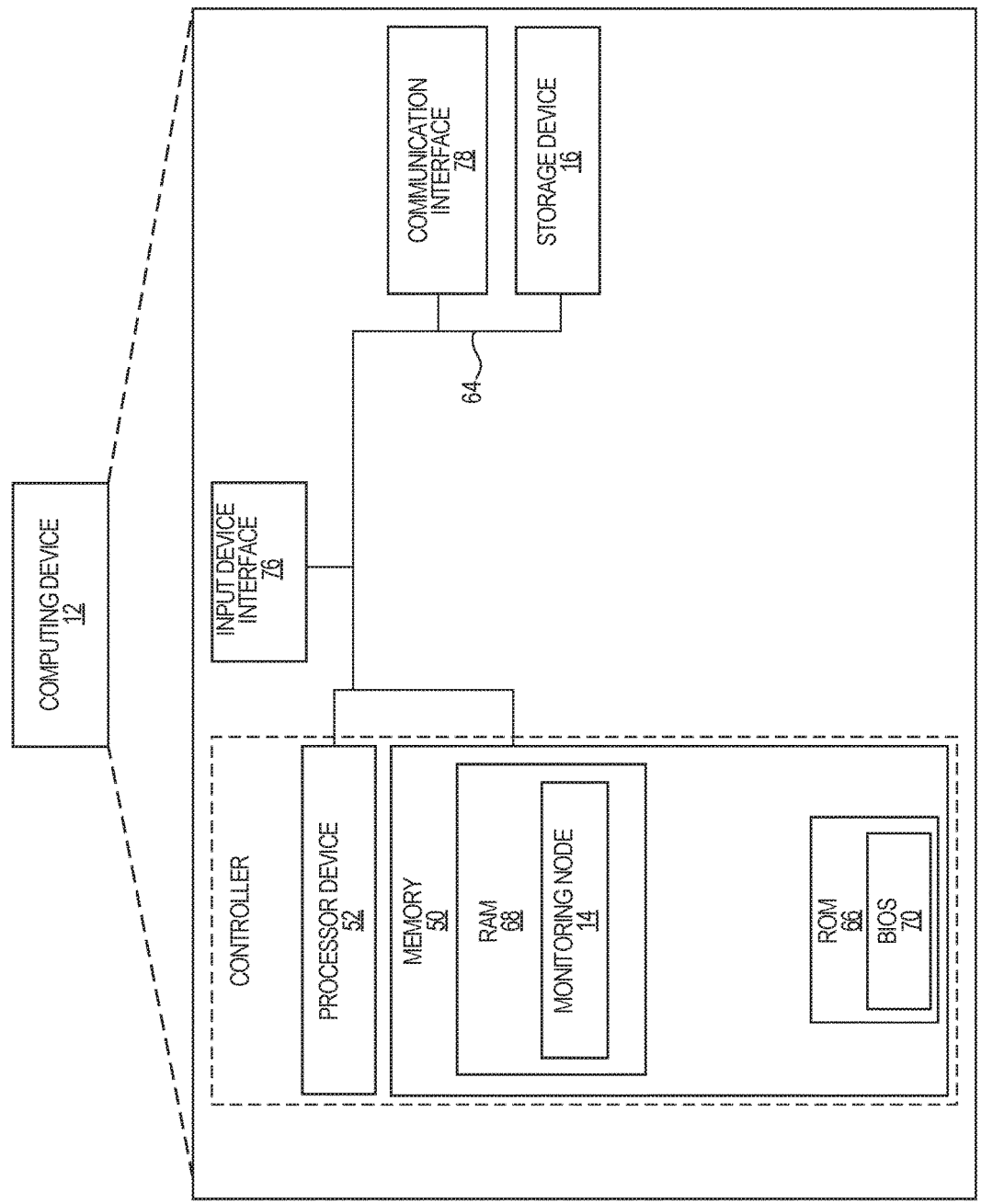
FIG. 8 is a block diagram of a computing device suitable for implementing examples according to one example.

FIG. 8 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 52, the system memory 50, and a system bus 64. The system bus 64 provides an interface for system components including, but not limited to, the system memory 50 and the processor device 52. The processor device 52 can be any commercially available or proprietary processor or processors.

The system bus 64 may be any of several types of bus structures that may further interconnect to a memory bus (with or without a memory controller), a peripheral bus, and/or a local bus using any of a variety of commercially available bus architectures. The system memory 50 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 12. The volatile memory 68 may also include a high-speed RAM, such as static RAM, for caching data.

The computing device 12 may further include or be coupled to a non-transitory computer-readable storage medium such as the storage device 16, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 16 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of processes can be stored in the storage device 16 and in the volatile memory 68, including an operating system and one or more processes, such as the monitoring node 14, which may implement the functionality described herein in whole or in part. All or a portion of the examples may be implemented as a computer program product stored on a transitory or non-transitory computer-usable or computer-readable storage medium, such as the storage device 16, which includes complex programming instructions, such as complex computer-readable program code, to cause the processor device 52 to carry out the steps described herein. Thus, the computer-readable program code can comprise software instructions for implementing the functionality of the examples described herein when executed on the processor device 52. The processor device 52, in conjunction with the monitoring node 14 in the volatile memory 68, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 52 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communication interface 78 suitable for communicating with the network 30 as appropriate or desired.

Figure 9:
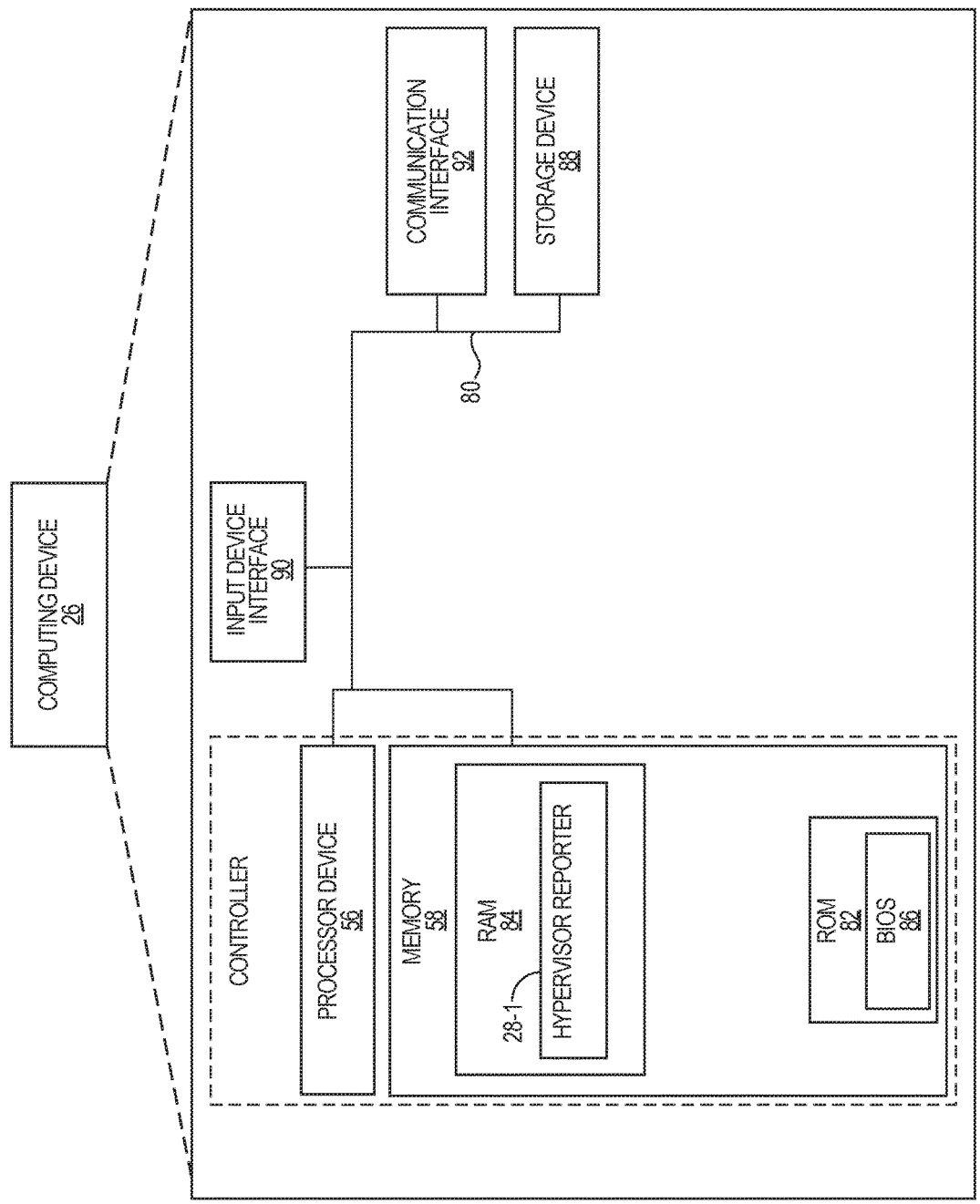
FIG. 9 is a block diagram of a computing device suitable for implementing examples according to another example.

FIG. 9 is a block diagram of the computing device 26 suitable for implementing examples according to one example. The computing device 26 may comprise any computing or electronic device capable of including firmware, hardware, and/or executing software instructions to implement the functionality described herein, such as a computer server, a desktop computing device, a laptop computing device, or the like. The computing device 26 includes the processor device 56, the system memory 58, and a system bus 80. The system bus 80 provides an interface for system components including, but not limited to, the system memory 58 and the processor device 56. The processor device 56 can be any commercially available or proprietary processor or processors.

The system bus 80 may be any of several types of bus structures that may further interconnect to a memory bus (with or without a memory controller), a peripheral bus, and/or a local bus using any of a variety of commercially available bus architectures. The system memory 58 may include non-volatile memory 82 (e.g., read-only memory (ROM), erasable programmable read-only memory (EPROM), electrically erasable programmable read-only memory (EEPROM), etc.), and volatile memory 84 (e.g., random-access memory (RAM)). A basic input/output system (BIOS) 86 may be stored in the non-volatile memory 82 and can include the basic routines that help to transfer information between elements within the computing device 26. The volatile memory 84 may also include a high-speed RAM, such as static RAM, for caching data.

The computing device 26 may further include or be coupled to a non-transitory computer-readable storage medium such as a storage device 88, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 88 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of processes can be stored in the storage device 88 and in the volatile memory 84, including an operating system and one or more processes, such as the hypervisor reporter 28-1, which may implement the functionality described herein in whole or in part. All or a portion of the examples may be implemented as a computer program product stored on a transitory or non-transitory computer-usable or computer-readable storage medium, such as the storage device 88, which includes complex programming instructions, such as complex computer-readable program code, to cause the processor device 56 to carry out the steps described herein. Thus, the computer-readable program code can comprise software instructions for implementing the functionality of the examples described herein when executed on the processor device 56. The processor device 56, in conjunction with the hypervisor reporter 28-1 in the volatile memory 84, may serve as a controller, or control system, for the computing device 26 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 56 through an input device interface 90 that is coupled to the system bus 80 but can be connected by other interfaces such as a parallel port, an Institute of Electrical and Electronic Engineers (IEEE) 1394 serial port, a Universal Serial Bus (USB) port, an IR interface, and the like. The computing device 26 may also include a communication interface 92 suitable for communicating with the network 30 as appropriate or desired.

Additional examples follow. One example is a method for notifying a monitoring node about a hypervisor, comprising: identifying, by a hypervisor reporter executing on a computing device comprising a processing device, a first hypervisor about which the hypervisor reporter is capable of generating a report; sending, to a monitoring node, a communication that identifies the first hypervisor; and receiving, from the monitoring node, a first report request that comprises one of a request to send a full report about the first hypervisor and a request to provide no reports about the first hypervisor.

Example 2 depends from example 1 wherein the first report request comprises the request to send the full report, and further comprises: generating the full report about the first hypervisor, the full report identifying each virtual machine associated with the first hypervisor; and sending the full report to the monitoring node.

Example 3 depends from example 2 and further comprises: receiving, from the monitoring node, a request that future reports about the first hypervisor be differential reports that identify a difference between a previous state of the first hypervisor and a subsequent state of the first hypervisor; determining the subsequent state of the first hypervisor, the subsequent state including an identification of each virtual machine associated with the first hypervisor at a current time; determining the previous state of the first hypervisor, the previous state including an identification of each virtual machine associated with the first hypervisor at a previous time; determining the difference between the subsequent state and the previous state; and sending, to the monitoring node, a differential report that identifies the difference between the subsequent state and the previous state.

Example 4 depends from example 1 wherein identifying the first hypervisor about which the hypervisor reporter is capable of generating the report further comprises: identifying the first hypervisor about which the hypervisor reporter is capable of generating the report and a second hypervisor about which the hypervisor reporter is capable of generating a report; and wherein the first report request comprises the request to send the full report about the first hypervisor and a request to provide no reports about the second hypervisor.

Example 5 depends from example 1 wherein the first report request comprises the request to provide no reports about the first hypervisor, and further comprises: waiting a period of time; not sending a report about the first hypervisor over the period of time; and sending, to the monitoring node, at the end of the period of time, a communication that indicates that the hypervisor reporter is still functioning.

Example 6 depends from example 5 and further comprises: after sending, to the monitoring node, the communication that indicates that the hypervisor reporter is still functioning, receiving, from the monitoring node, the first report request to send the full report about the first hypervisor; sending the full report about the first hypervisor to the monitoring node, the full report including an identification of each virtual machine associated with the first hypervisor; and receiving, from the monitoring node, information that requests that future reports about the first hypervisor be differential reports that identify a difference between a previous state of the first hypervisor and a subsequent state of the first hypervisor.

Example 7 depends from example 6 and further comprises: determining the subsequent state of the first hypervisor, the subsequent state including an identification of each virtual machine associated with the first hypervisor at a current time; determining the previous state of the first hypervisor, the previous state including an identification of each virtual machine associated with the hypervisor at a previous time; determining the difference between the subsequent state and the previous state; and sending, to the monitoring node, the differential report that identifies the difference between the subsequent state and the previous state.

Example 8 depends from example 1 wherein the first report request comprises the request to provide no reports about the first hypervisor, and further comprises: identifying, at a subsequent point in time, a second hypervisor about which the hypervisor reporter is capable of generating a report; sending, to the monitoring node, a communication that identifies the second hypervisor; and receiving, from the monitoring node, a second report request to send a full report about the second hypervisor.

Example 9 is a computing device, comprising: a memory; a processor device coupled to the memory to: receive a first communication from a first hypervisor reporter that identifies a first hypervisor as a hypervisor about which the first hypervisor reporter can generate reports over time; determine that no other hypervisor reporter is a current authority for the first hypervisor; designate the first hypervisor reporter as a current authority for the first hypervisor; and request, from the first hypervisor reporter, a full report about the first hypervisor.

Example 10 is a computer program product stored on a non-transitory computer-readable storage medium and including instructions that cause a processor device to: receive a first communication from a first hypervisor reporter that identifies a first hypervisor as a hypervisor about which the first hypervisor reporter can generate reports over time; determine that no other hypervisor reporter is a current authority for the first hypervisor; designate the first hypervisor reporter as a current authority for the first hypervisor; and request, from the first hypervisor reporter, a full report about the first hypervisor.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a computing device comprising a processor device, a first communication from a first hypervisor reporter that identifies a first hypervisor as a hypervisor about which the first hypervisor reporter can generate reports over time;

determining, by the computing device based on information maintained by the computing device, that no other hypervisor reporter is a current authority for the first hypervisor;

designating, by the computing device, the first hypervisor reporter as a current authority for the first hypervisor; and requesting, from the first hypervisor reporter, a first full report about the first hypervisor.

2. The method of claim 1 further comprising:

receiving the first full report from the first hypervisor reporter, the first full report including an identification of each virtual machine associated with the first hypervisor; and sending, to the first hypervisor reporter, information that requests that future reports about the first hypervisor be differential reports that identify a difference between a previous state of the first hypervisor and a subsequent state of the first hypervisor.

3. The method of claim 2 wherein the first full report further includes a status identifier that identifies a status of each virtual machine associated with the first hypervisor.

4. The method of claim 2 further comprising:

receiving, from the first hypervisor reporter, a first differential report that identifies the difference between the previous state of the first hypervisor and the subsequent state of the first hypervisor.

5. The method of claim 4 wherein the first differential report identifies the difference between the previous state of the first hypervisor at a first time of the first full report and the subsequent state of the first hypervisor at a current time, the difference including information that identifies any additional virtual machines associated with the first hypervisor since the first time and information that identifies any virtual machines that were associated with the first hypervisor at the first time but are no longer associated with the first hypervisor at the current time.

6. The method of claim 1 further comprising:

receiving, by the computing device, a second communication from a second hypervisor reporter that identifies the first hypervisor as a hypervisor about which the second hypervisor reporter can generate reports over time;

determining, by the computing device, that the first hypervisor reporter is the current authority for the first hypervisor;

storing information that identifies the second hypervisor reporter as being capable of reporting about the first hypervisor; and sending, to the second hypervisor reporter, information that instructs the second hypervisor reporter to provide no reports about the first hypervisor.

7. The method of claim 6 further comprising:

determining that the first hypervisor reporter is not communicating;

determining that the second hypervisor reporter is capable of reporting about the first hypervisor;

designating the second hypervisor reporter as the current authority for the first hypervisor; and requesting, from the second hypervisor reporter, a second full report about the first hypervisor that includes the identification of each virtual machine associated with the first hypervisor.

8. The method of claim 7 further comprising:

receiving the second full report from the second hypervisor reporter; and sending, to the second hypervisor reporter, information that requests that future reports from the second hypervisor reporter be differential reports that identify a difference between a previous state of the first hypervisor and a subsequent state of the first hypervisor.

9. The method of claim 1 further comprising:

receiving, by the computing device, a second communication from a second hypervisor reporter that identifies the first hypervisor and a second hypervisor as hypervisors about which the second hypervisor reporter can generate reports over time;

determining, by the computing device, that the first hypervisor reporter is the current authority for the first hypervisor;

determining that no other hypervisor reporter is currently providing a report about the second hypervisor;

storing information that identifies the second hypervisor reporter as being capable of reporting about the first hypervisor and the second hypervisor; and sending, to the second hypervisor reporter, information that instructs the second hypervisor reporter to provide no reports about the first hypervisor and that requests a second full report about the second hypervisor.

10. The method of claim 9 further comprising:

receiving the second full report about the second hypervisor from the second hypervisor reporter, the second full report about the second hypervisor including an identification of each virtual machine associated with the second hypervisor; and sending, to the second hypervisor reporter, information that requests that future reports about the second hypervisor be differential reports that identify a difference between a previous state of the second hypervisor and a subsequent state of the second hypervisor.

11. The method of claim 1 further comprising:

associating a subscription with the first hypervisor that provides software license rights to one or more virtual machines associated with the first hypervisor.

12. The method of claim 1 further comprising:

receiving the first full report;

determining a number of virtual machines identified in the first full report; and deducting the number of virtual machines from a value that identifies a number of remaining software licenses for the first hypervisor.

13. The method of claim 1 further comprising:

receiving, by the computing device, a second communication from a second hypervisor reporter that identifies the first hypervisor as a hypervisor about which the second hypervisor reporter can generate reports over time.

14. A computing device, comprising:

a memory;

a processor device coupled to the memory to:

receive a first communication from a first hypervisor reporter that identifies a first hypervisor as a hypervisor about which the first hypervisor reporter can generate reports over time;

determine that no other hypervisor reporter is a current authority for the first hypervisor;

designate the first hypervisor reporter as the current authority for the first hypervisor; and request, from the first hypervisor reporter, a first full report about the first hypervisor.

15. The computing device of claim 14 wherein the processor device is further to:

receive the first full report from the first hypervisor reporter, the first full report including an identification of each virtual machine associated with the first hypervisor; and send, to the first hypervisor reporter, information that requests that future reports about the first hypervisor be differential reports that identify a difference between a previous state of the first hypervisor and a subsequent state of the first hypervisor.

16. The computing device of claim 15 wherein the processor device is further to:

receive, from the first hypervisor reporter, a first differential report that identifies the difference between the previous state of the first hypervisor and the subsequent state of the first hypervisor.

17. The computing device of claim 14 wherein the processor device is further to:

receive a second communication from a second hypervisor reporter that identifies the first hypervisor as a hypervisor about which the second hypervisor reporter can generate reports over time;

determine that the first hypervisor reporter is the current authority for the first hypervisor;

store information that identifies the second hypervisor reporter as being capable of reporting about the first hypervisor; and send, to the second hypervisor reporter, information that instructs the second hypervisor reporter to provide no reports about the first hypervisor.

18. A computer program product stored on a non-transitory computer-readable storage medium and including instructions that cause a processor device to:

receive a first communication from a first hypervisor reporter that identifies a first hypervisor as a hypervisor about which the first hypervisor reporter can generate reports over time;

determine that no other hypervisor reporter is a current authority for the first hypervisor;

designate the first hypervisor reporter as the current authority for the first hypervisor; and request, from the first hypervisor reporter, a first full report about the first hypervisor.

19. The computer program product of claim 18 wherein the instructions further cause the processor device to:

receive the first full report from the first hypervisor reporter, the first full report including an identification of each virtual machine associated with the first hypervisor; and send, to the first hypervisor reporter, information that requests that future reports about the first hypervisor be differential reports that identify a difference between a previous state of the first hypervisor and a subsequent state of the first hypervisor.

20. The computer program product of claim 19 wherein the instructions further cause the processor device to:

receive, from the first hypervisor reporter, a first differential report that identifies the difference between the previous state of the first hypervisor and the subsequent state of the first hypervisor.

21. The computer program product of claim 18 wherein the instructions further cause the processor device to:

receive a second communication from a second hypervisor reporter that identifies the first hypervisor as a hypervisor about which the second hypervisor reporter can generate reports over time;

determine that the first hypervisor reporter is the current authority for the first hypervisor;

store information that identifies the second hypervisor reporter as being capable of reporting about the first hypervisor; and send, to the second hypervisor reporter, information that instructs the second hypervisor reporter to provide no reports about the first hypervisor.

* * * * *